(12) United States Patent
Shirai et al.

(10) Patent No.: US 6,765,653 B2
(45) Date of Patent: Jul. 20, 2004

(54) ELECTRONIC DISTANCE METER

(75) Inventors: Masami Shirai, Saitama (JP); Shinichi Suzuki, Saitama (JP); Homu Takayama, Saitama (JP)

(73) Assignees: PENTAX Corporation, Tokyo (JP); PENTAX Precision Co., Ltd, Tokyo (JP)

(*) Notice: Subject to any disclaimer, the term of this patent is extended or adjusted under 35 U.S.C. 154(b) by 124 days.

(21) Appl. No.: 09/862,490

(22) Filed: May 23, 2001

(65) Prior Publication Data

US 2002/0044270 A1 Apr. 18, 2002

(30) Foreign Application Priority Data

May 25, 2000 (JP) ........................................ 2000-154255

(51) Int. Cl.[7] .............................................. G01C 3/08
(52) U.S. Cl. ..................................... 356/4.01; 356/5.01
(58) Field of Search ............................. 356/3.01–5.15; 250/201, 201.2, 201.4

(56) References Cited

U.S. PATENT DOCUMENTS

| | | | | |
|---|---|---|---|---|
| 3,464,770 A | * | 9/1969 | Schmidt ........................ 356/4 |
| 4,383,168 A | * | 5/1983 | Luck, Jr. ..................... 250/201 |
| 4,595,271 A | * | 6/1986 | Suda et al. .................. 354/403 |
| 4,686,360 A | * | 8/1987 | Gorgon ....................... 250/201 |
| 4,715,708 A | * | 12/1987 | Ito ............................... 356/72 |
| 4,810,088 A | * | 3/1989 | Karning et al. ................. 356/5 |
| 4,843,228 A | * | 6/1989 | Nakamura ................... 250/201 |
| 4,916,324 A | * | 4/1990 | Meier ......................... 250/561 |
| 4,935,612 A | * | 6/1990 | Bierleutgeb ............... 250/201.2 |
| 4,958,920 A | * | 9/1990 | Jorgens et al. .............. 350/530 |
| 5,082,362 A | * | 1/1992 | Schneiter ....................... 356/1 |
| 5,288,987 A | * | 2/1994 | Vry et al. ................. 250/201.3 |
| 5,329,347 A | * | 7/1994 | Wallace et al. ................. 356/5 |
| 5,432,330 A | * | 7/1995 | Nakamura ............... 250/201.4 |
| 5,483,056 A | * | 1/1996 | Imai ......................... 250/201.4 |
| 5,512,760 A | * | 4/1996 | Horijon et al. ......... 350/559.29 |
| 5,774,208 A | | 6/1998 | Abe |
| 5,923,468 A | | 7/1999 | Tsuda et al. |
| 6,226,076 B1 | * | 5/2001 | Yoshida ..................... 356/5.06 |
| 6,324,024 B1 | * | 11/2001 | Shirai et al. ................. 359/884 |
| 6,411,371 B1 | * | 6/2002 | Hinderling et al. ........ 356/4.01 |

FOREIGN PATENT DOCUMENTS

| | | |
|---|---|---|
| DE | 19840049 | 4/2000 |
| JP | 4-319687 | 11/1992 |

* cited by examiner

Primary Examiner—Thomas H. Tarcza
Assistant Examiner—Brian K Andrea
(74) Attorney, Agent, or Firm—Greenblum & Bernstein, P.L.C.

(57) ABSTRACT

An electronic distance meter includes a sighting telescope having an objective lens for sighting an object; a reflection member provided behind the objective lens, wherein the reflection member is positioned so as to be eccentric with respect to an optical axis of the objective lens; and an optical distance meter which includes a light-transmitting optical system for transmitting a measuring light via the reflection member and the objective lens, and a light-receiving optical system for receiving a portion of the measuring light which is reflected by the object, subsequently passed through the objective lens, and not obstructed by the reflection member.

17 Claims, 12 Drawing Sheets

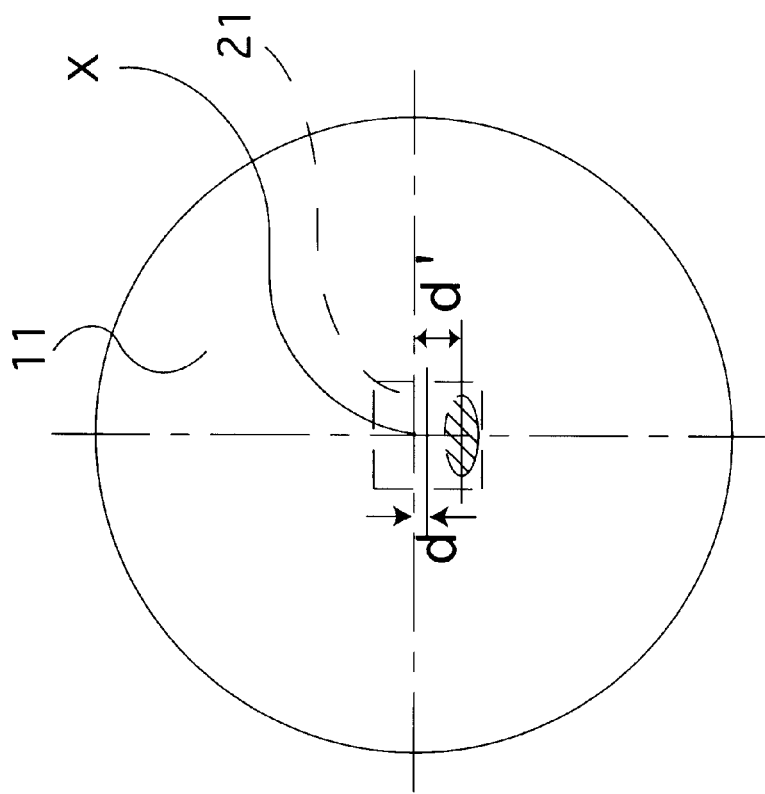
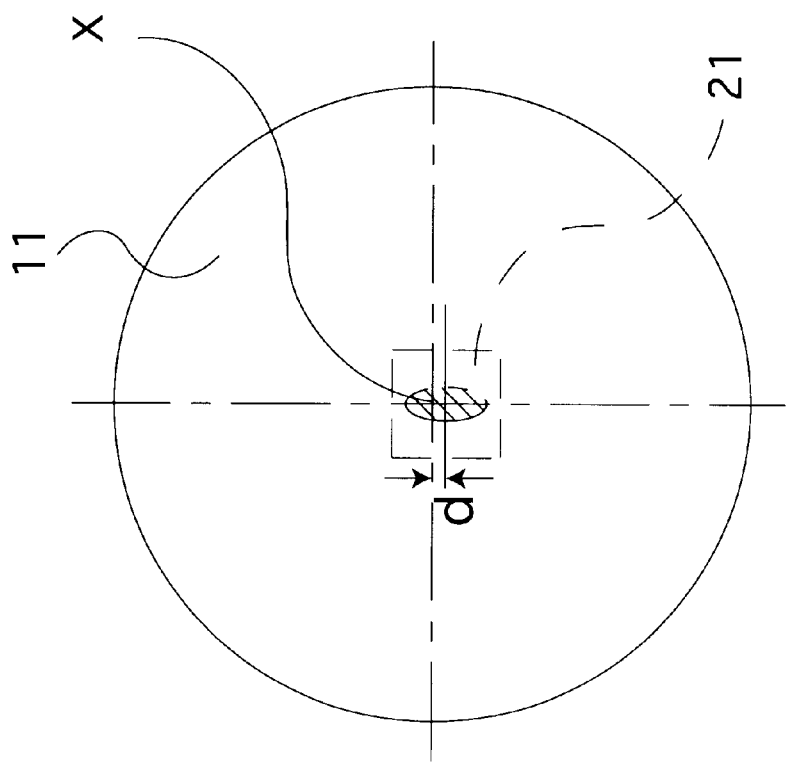

ELECTRONIC DISTANCE METER

BACKGROUND OF THE INVENTION

1. Field of the Invention

The present invention relates to an electronic distance meter having a sighting telescope.

2. Description of the Related Art

When a surveyor measures the distance between two points, an electronic distance meter (EDM) is generally used. An electronic distance meter calculates the distance via the phase difference between a projecting light and a reflected light and via the initial phase of an internal reference light, or via the time difference between the projecting light and the reflected light.

A typical electronic distance meter is provided, behind the objective lens of a sighting telescope thereof, with a light transmitting mirror positioned on the optical axis of the sighting telescope to project the measuring light toward a target through the center of the entrance pupil of the objective lens of the sighting telescope. The light which is reflected by the target to be passed through the objective lens of the sighting telescope passes the peripheral space of the light transmitting mirror to be captured via a wavelength selection filter and a light receiving mirror.

In such an electronic distance meter, the light which is reflected by the target and passed through the objective lens of the sighting telescope is interrupted by the aforementioned light transmitting mirror by a greater amount as the target is closer to the electronic distance meter. If the light which is reflected by the target and passed through the objective lens of the sighting telescope is interrupted by the light transmitting mirror by a great amount, the light amount of the incident light upon a light receiving element (photo-receiver) provided in the electronic distance meter decreases, which deteriorates the precision in measuring the object distance. If the target is very close to the electronic distance meter, the light which is reflected by the target and passed through the objective lens of the sighting telescope may not be incident on the light receiving element (photo-receiver) at all, which makes it impossible to perform a distance measuring operation. To prevent these problems from occurring, various methods have been proposed.

SUMMARY OF THE INVENTION

The present invention has been devised in view of the problems noted above, and accordingly, an object of the present invention is to provide an electronic distance meter which is free from the aforementioned problem of a decrease in the amount of incident light upon the aforementioned light receiving element when the target is close to the electronic distance meter, and furthermore, is free from the aforementioned problem of deterioration of the precision in measuring the object distance that is caused by a decrease in the amount of incident light upon the light receiving mirror. Another object of the present invention is to provide an electronic distance meter equipped with an autofocus system which is free from the above-mentioned problems.

To achieve the objects mentioned above, according to an aspect of the present invention, an electronic distance meter is provided, including a sighting telescope having an objective lens for sighting an object; a reflection member provided behind the objective lens, wherein the reflection member is positioned so as to be eccentric with respect to an optical axis of the objective lens; an optical distance meter which includes a light-transmitting optical system for transmitting a measuring light via the reflection member and the objective lens, and a light-receiving optical system for receiving a portion of the measuring light which is reflected by the object, subsequently passed through the objective lens, and not obstructed by the reflection member; and a measuring-light incident position changing device for changing an incident point of a central axis of the measuring light on a reflection surface of the reflection member between a first incident point on the reflection surface away from a point of intersection of the reflection surface and the optical axis of the objective lens, and a second incident point on the reflection surface on either the point of intersection or substantially on the point of intersection.

Preferably, the reflection member is positioned so as to satisfy the following relationship: b>c wherein "b" designates the distance from the optical axis of the objective lens to an edge of a cross section of the measuring light in a first direction of eccentricity of the reflection member, and "c" designates the distance from the optical axis of the objective lens to an edge of the light reflection member in a second direction opposite to the first direction of eccentricity of the reflection member.

In an embodiment, the measuring-light incident position changing device includes a diaphragm positioned on an optical path of the measuring light. The incident point of a central axis of the measuring light on the reflection surface is changed by moving the diaphragm in a direction perpendicular to the optical path of the measuring light.

In an embodiment, the electronic distance meter further includes a controller which controls the measuring-light incident position changing device so that the measuring-light incident position changing device changes the incident point of the central axis of the measuring light to the first incident point and the second incident point when the object is positioned at a short distance and a long distance, respectively.

In an embodiment, the sighting telescope includes a focus adjustment lens guided along an optical axis of the sighting telescope; wherein the electronic distance meter further includes a lens position detection device which detects an axial position of the focus adjustment lens. The controller controls the measuring-light incident position changing device so that the measuring-light incident position changing device changes the incident point of the central axis of the measuring light between the first incident point and the second incident point in accordance with a result of detection of the lens position detection device.

In an embodiment, the measuring-light incident position changing device includes a plane-parallel plate disposed between a light-emitting element which emits the measuring light and the reflection member, wherein the plane-parallel plate is inclined with respect to a plane perpendicular to an optical axis of the light-transmitting optical system.

In an embodiment, the controller controls the plane-parallel plate so as to rotate in first and second rotational directions by a same angle of rotation when the object is positioned at the short distance and the long distance, respectively.

In an embodiment, the reflection member is made of a parallel-plate mirror having front and rear surfaces parallel to each other; wherein the reflection member is inclined to the optical axis of the objective lens. The surface of the reflection member on which the point of intersection is positioned is the front surface of the reflection member which faces the objective lens.

In an embodiment, the light-transmitting optical system includes a collimating lens positioned between the light-emitting element and the plane-parallel plate.

In an embodiment, the light-receiving optical system includes a wavelength selection filter positioned behind the reflection member.

In an embodiment, the measuring-light incident position changing device includes a motor for rotating the plane-parallel plate.

In an embodiment, the measuring-light incident position changing device includes two mirrors which are arranged parallel to each other and are provided between a light-emitting element which emits the measuring light and the reflection member, wherein one of the two mirrors is driven to move relative to the other of the two mirrors in order to change the incident position of the central axis of the measuring light.

According to an another aspect of the present invention, an electronic distance meter is provided, including a sighting telescope having an objective lens and a focusing lens for sighting an object; a reflection member provided behind the objective lens, wherein the reflection member is position so as to be eccentric with respect to an optical axis of the objective lens; an optical distance meter which includes a light-transmitting optical system for transmitting a measuring light via the reflection member and the objective lens, and a light-receiving optical system for receiving a portion of the measuring light which is reflected by the object, subsequently passed through the objective lens and not obstructed by the reflection member; a focus detecting device for detecting a focus state of the sighting telescope; and an autofocus drive system which drives the focusing lens to bring the object into focus in accordance with the focus state detected by the focus detecting device.

In an embodiment, the measuring light projected toward the object via the light-transmitting optical system travels toward the object along an optical path which is eccentric with respect to the optical axis of the objective lens.

In an embodiment, the electronic distance meter further includes a diaphragm positioned on an optical path of the measuring light. The measuring light is made to be eccentric with respect to the optical axis of the objective lens by moving the diaphragm in a direction perpendicular to the optical path of the measuring light.

In an embodiment, the reflection member is made of a parallel-plate mirror having front and rear surfaces parallel to each other, wherein the reflection member is inclined to the optical axis of the objective lens. A reflection surface of the reflection member on which a point of intersection of the reflection surface and the optical axis of the objective lens is positioned includes the front surface of the reflection member which faces the objective lens.

In an embodiment, the light-transmitting optical system includes a collimating lens positioned between the light-emitting element and the plane-parallel plate.

In an embodiment, the light-receiving optical system includes a wavelength selection filter positioned behind the reflection member.

In an embodiment, the electronic distance meter further includes a measuring-light incident position changing device for changing an incident point of the central axis of the measuring light on a reflection surface of the reflection member between a first incident point on the reflection surface away from the optical axis of the objective lens and a second incident point on the reflection surface on either the optical axis of the objective lens or substantially on the optical axis.

In an embodiment, the measuring-light incident position changing device includes a motor for rotating the plane-parallel plate.

In an embodiment, the measuring-light incident position changing device includes two mirrors which are arranged parallel to each other and are provided between a light-emitting element which emits the measuring light and the reflection member, wherein one of the two mirrors is driven to move relative to the other of the two mirrors in order to change the incident position of the central axis of the measuring light.

In an embodiment, the electronic distance meter includes a controller which controls the measuring-light incident position changing device so that the measuring-light incident position changing device changes the incident point of the central axis of the measuring light to the first incident point and the second incident point when the controller determines that the object is positioned at a short distance and a long distance, respectively, in accordance with the focus state of the sighting telescope which is detected by the focus detecting device.

In an alternative embodiment, the electronic distance meter includes a controller which controls the measuring-light incident position changing device so that the measuring-light incident position changing device changes the incident point of the central axis of the measuring light to the first incident point and the second incident point when the controller determines that the object is positioned at a short distance and a long distance, respectively, in accordance with an axial position of the focusing lens driven by the autofocus drive system.

In an embodiment, the measuring-light incident position changing device includes a plane-parallel plate disposed between a light-emitting element which emits the measuring light and the reflection member, wherein the plane-parallel plate is inclined with respect to a plane perpendicular to an optical axis of the light-transmitting optical system.

In an embodiment, the controller controls the plane-parallel plate so as to rotate in first and second rotational directions by a same angle of rotation when the object is positioned at the short distance and the long distance, respectively.

In an embodiment, the focus detecting device includes a phase-difference detection focus detecting device which detects an in-focus state from a correlation between a pair of images respectively formed by two light bundles which are respectively passed through two different pupil areas on the objective lens of the sighting telescope.

In an embodiment, the focus detecting device includes a phase-difference detection focus detecting device which detects an in-focus state from a correlation between a pair of images respectively formed by two light bundles which are respectively passed through two different pupil areas on the objective lens of the sighting telescope; wherein a direction of eccentricity of the reflection member extends perpendicular to a direction of separation of the two pupil areas.

The present disclosure relates to subject matter contained in Japanese Patent Application No.2000-154255 (filed on May 25, 2000) which is expressly incorporated herein by reference in its entirety.

BRIEF DESCRIPTION OF THE DRAWINGS

The present invention will be described below in detail with reference to the accompanying drawings in which:

FIG. 4 is an explanatory view of the objective lens of the sighting telescope, as viewed in the direction of arrows III shown in FIG. 1, showing an embodiment of the positional relationship among the objective lens, the light transmitting/receiving mirror and a cross section of an externally-projecting measuring light taken along III—III line in FIG. 1;

FIG. 5 is a view similar to that of FIG. 4 and illustrates another embodiment of the positional relationship among the objective lens, the light transmitting/receiving mirror and a cross section of the externally-projecting measuring light;

DESCRIPTION OF THE PREFERRED EMBODIMENTS

Figure 1:
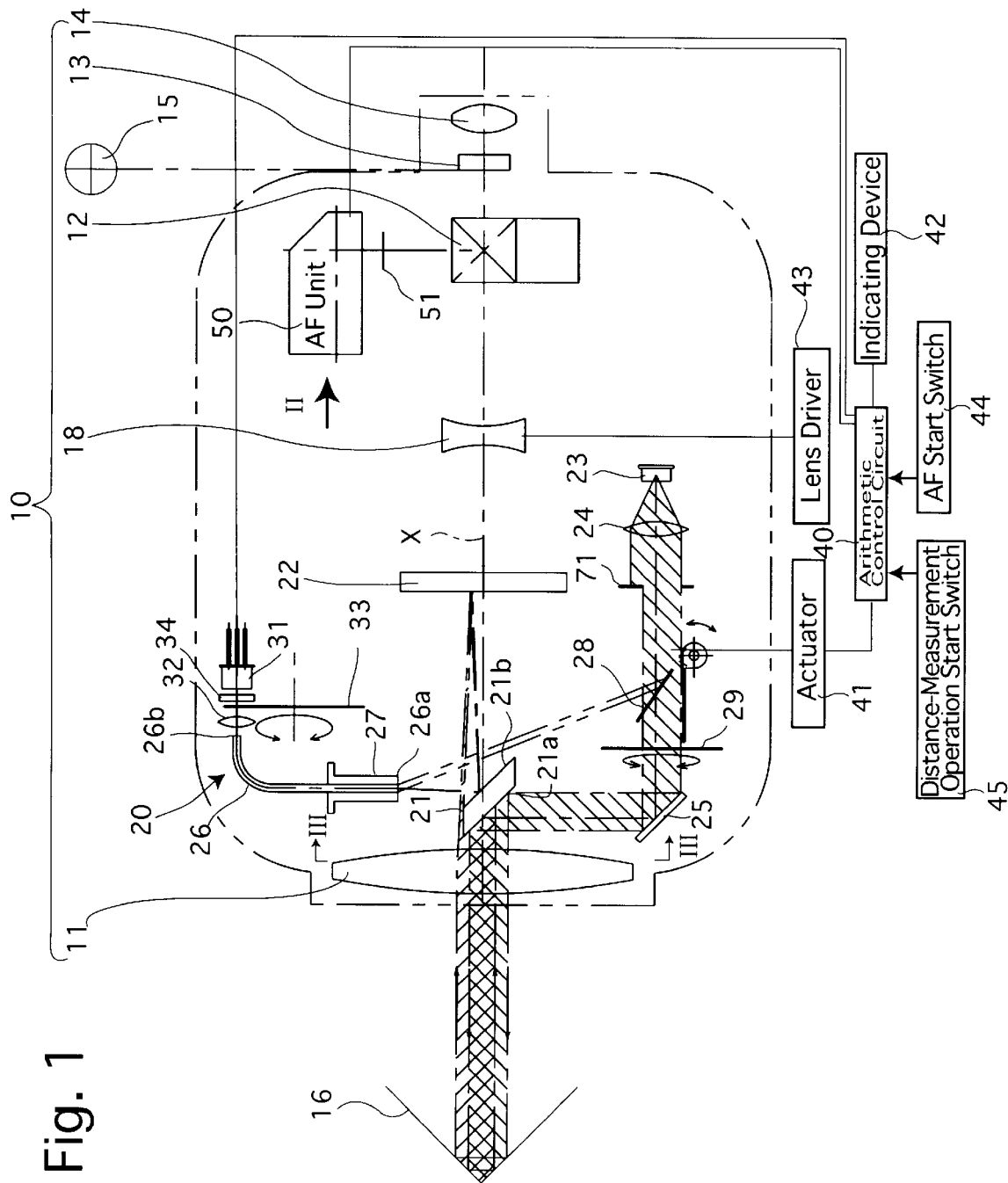
FIG. 1 is a schematic diagram of the first embodiment of an electronic distance meter equipped with an autofocus system, according to the present invention.

FIGS. 1 through 7 show the first embodiment of an electronic distance meter (EDM) equipped with an autofocus system, according to the present invention. The electronic distance meter is provided with a sighting telescope (sighting telescope optical system) 10 and an optical distance meter 20. As shown in FIG. 1, the sighting telescope 10 is provided with an objective lens 11, a focusing lens (focus adjustment lens) 18, a Porro-prism erecting system 12, a focal-plane plate (reticle plate) 13, and an eyepiece lens 14, in that order from the object side (i.e., left to right as shown in FIG. 1). The focal-plane plate 13 is provided thereon with a reticle (cross hair) 15. The focusing lens 18 is guided in a direction of an optical axis of the sighting telescope 10. The image of a corner cube reflector (sighting object) 16 that is formed through the objective lens 11 can be precisely focused on the front surface (the surface facing the objective lens 11) of the focal-plane plate 13 by adjusting the axial position of the focusing lens 18 in accordance with the distance of the corner cube reflector 16 with respect to the sighting telescope 10. The user (surveyor) of the surveying instrument sights a magnified image of the corner cube reflector 16, which is focused on the focal-plane plate 13, via the eyepiece 14.

The electronic distance meter is provided, behind the objective lens 11 of the sighting telescope 10, with a light transmitting/receiving mirror (reflection member) 21 and a wavelength selection mirror (wavelength selection filter) 22, which are arranged in that order from the object side. The light transmitting/receiving mirror 21 is made of a parallel-plate mirror having front and rear parallel surfaces positioned on the optical axis of the objective lens 11. The front surface of the parallel-plate mirror which faces the objective lens 11 is formed as a light transmitting mirror 21a, while the rear surface of the parallel-plate mirror which faces the wavelength selection mirror 22 is formed as a light receiving mirror 21b. The light receiving mirror 21b and the wavelength selection mirror 22 are fundamental optical elements of a light-receiving optical system of the optical distance meter 20.

The optical distance meter 20 is provided with a light-emitting element (laser diode) 23 which emits light (measuring light) having a specific wavelength. The measuring light emitted from the light-emitting element 23 is incident on the light transmitting mirror 21a via a collimating lens 24 and a fixed mirror 25. The measuring light, emitted from the light-emitting element 23 to be incident on the light transmitting mirror 21a, is reflected thereby to proceed toward the corner cube reflector along the optical axis of the objective lens 11. The collimating lens 24, the fixed mirror 25 and the light transmitting mirror 21a (light transmitting/receiving mirror 21) are fundamental optical elements of a light-transmitting optical system of the optical distance meter 20.

The portion of the measuring light which is reflected by the corner cube reflector 16, subsequently passed through the objective lens 11 which is not interrupted by the light transmitting/receiving mirror 21 is eventually reflected back to the light receiving mirror 21b by the wavelength selection mirror 22. Thereafter, the light receiving mirror 21b reflects the incident measuring light so as to make the measuring light enter at an incident end surface 26a of a light receiving optical fiber 26. A fiber holder 27 supports the incident end of the light receiving optical fiber 26 which has the incident end surface 26a. The fiber holder 27 is immovably supported together with the light transmitting/receiving mirror 21 by a fixing device (not shown) provided in a space behind the objective lens 11.

The electronic distance meter is provided between the light-emitting element 23 and the fixed mirror 25, on a distance-measuring optical path, with a switching mirror 28 and an ND filter 29. The light (measuring light) emitted by the light-emitting element 23 is incident on the fixed mirror 25 when the switching mirror 28 is retracted from the distance-measuring optical path between the collimating lens 24 and the fixed mirror 25, and the light (internal reference light) emitted by the light-emitting element 23 is reflected by the switching mirror 28 to be incident directly on the incident end surface 26a of the light receiving optical fiber 26 when the switching mirror 28 is positioned in the distance-measuring optical path between the collimating lens 24 and the fixed mirror 25. The ND filter 29 is used to adjust the amount of light of the measuring light incident on the corner cube reflector 16.

The electronic distance meter is provided between an exit end surface 26b of the light receiving optical fiber 26 and a light-receiving element 31 with a condenser lens 32, an ND filter 33 and a band-pass filter 34, in that order from the exit end surface 26b to the light-receiving element 31. The light-receiving element 31 is connected to an arithmetic control circuit (controller) 40. The arithmetic control circuit 40 is connected to an actuator 41 which drives the switching mirror 28, and an indicating device (e.g., an LCD panel) 42 which indicates the calculated distance.

As is known in the art, the optical distance meter 20 establishes two different states: one state wherein the measuring light emitted by the light-emitting element 23 is supplied to the fixed mirror 25, and another state wherein the same light (internal reference light) is directly supplied to the incident end surface 26a of the light receiving optical fiber 26, which are determined in accordance with the switching state of the switching mirror 28 driven by the arithmetic control circuit 40 via the actuator 41. As described above, the measuring light supplied to the fixed mirror 25 is projected toward the corner cube reflector 16 via the light-transmitting mirror 21a and the objective lens 11, and the measuring light reflected by the corner cube reflector 16 is incident on the incident end surface 26a via the objective lens 11, the wavelength selection mirror 22, and the light receiving mirror 21b. Thereafter, both the measuring light reflected by the corner cube reflector 16 to be eventually incident on the incident end surface 26a, and the internal reference light directly supplied to the incident end surface 26a via the switching mirror 28 are received by the light-receiving element 31. The arithmetic control circuit 40 detects the phase difference between the projecting light (external light) and the reflected light and the initial phase of the internal reference light, or the time difference between the projecting light and the reflected light, to calculate the distance from the electronic distance meter to the corner cube reflector 16. The calculated distance is indicated by the indicating device 42. Such an operation of calculating the distance from the phase difference between the projecting light (external light) and the reflected light and from the initial phase of the internal reference light, or from the time difference between the projecting light and the reflected light is well known in the art.

Figure 2:
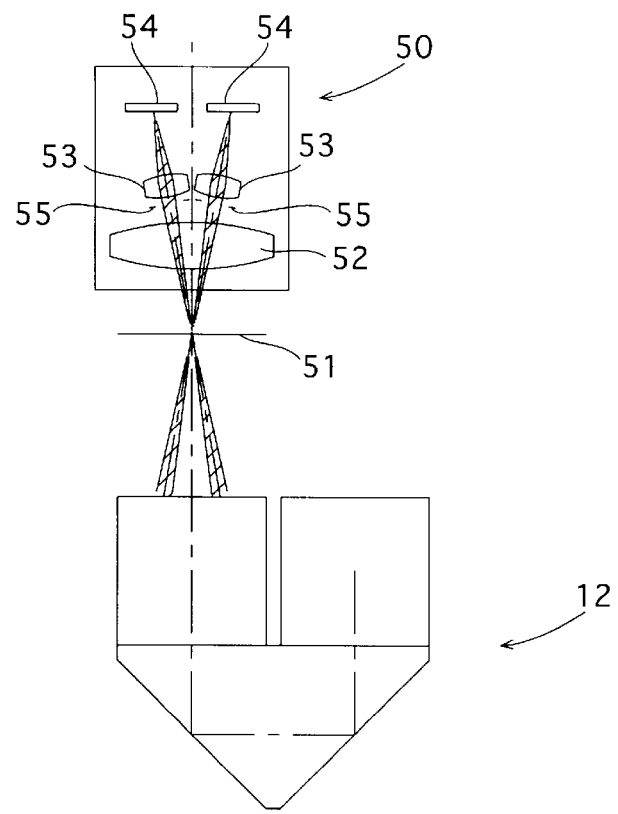
FIG. 2 is a conceptual diagram of a focus detecting device (an AF sensor unit/phase-difference detection type focus detecting device) and a Porro prism, as viewed in the direction of an arrow II shown in FIG. 1.

The Porro-prism erecting system 12 is provided with a beam splitting surface which splits the incident light bundle into two light bundles, so that one of the two light bundles proceeds toward a phase-difference detection type AF sensor unit (focus detecting device/phase-difference detection focus detecting device) 50 while the other light bundle proceeds toward the eyepiece 14. A reference focal plane 51 is formed between the Porro-prism erecting system 12 and the AF sensor unit 50 which is located at a position optically equivalent to the position at which the reticle 15 of the focal-plane plate 13 is placed. The AF sensor unit 50 detects the focus state (i.e., the amount of defocus and direction of focal shift) on the reference focal plane 51. FIG. 2 shows a conceptual diagram of the AF sensor unit 50 and the Porro-prism erecting system 12. The AF sensor unit 50 includes a condenser lens 52, a pair of separator lenses 53, a pair of separator masks 55 located in the close vicinity of the pair of separator lenses 53, and a pair of line sensors (e.g., multi segment CCD sensors) 54 located behind the respective separator lenses 53. The pair of separator lenses 53 are arranged apart from each other by the base length. The image of the corner cube reflector 16 formed on the reference focal plane 51 is separated into two images by the pair of separator lenses 53 to be respectively formed on the pair of line sensors 54. Each of the pair of line sensors 54 includes an array of photoelectric converting elements. Each photoelectric converting element converts the received light of an image into electric charges which are integrated (accumulated), and outputs as an integrated electric charge to the arithmetic control circuit 40 to constitute AF sensor data. The arithmetic control circuit 40 calculates an amount of defocus through a predetermined defocus operation in accordance with a pair of AF sensor data respectively input from the pair of line sensors 54. In an autofocus operation, the arithmetic control circuit 40 drives the focusing lens 18 to bring the corner cube reflector 16 into focus via a lens driver (see FIG. 1) 43 in accordance with the calculated amount of defocus. The defocus operation is well-known in the art. An AF start switch 44 and a distance-measurement operation start switch 45 are connected to the arithmetic control circuit 40.

The phase-difference detection AF sensor unit 50 detects an in-focus state from the pair of images respectively formed on the pair of line sensors 54 by two light bundles which are respectively passed through two different pupil areas 11A and 11B on the objective lens 11. The shape of each of the two pupil areas 11A and 11B are determined by the shape of the aperture formed on a corresponding one of a pair of separator masks 55 which are respectively positioned in the vicinity of the pair of separator lenses 53 between the condenser lens 52 and the pair of separator lenses 53. It should be noted that the hatched areas seen in FIGS. 2 and 3 conceptually indicate areas which correspond to the pupil areas determined by the apertures of the pair of separator masks 55.

Figure 3:
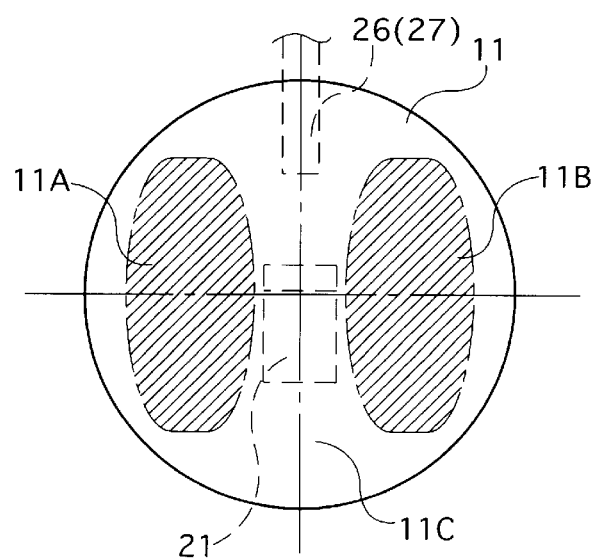
FIG. 3 is an explanatory view of an objective lens of a sighting telescope, as viewed in the direction of arrows III shown in FIG. 1, showing the positional relationship among a pair of pupil areas defined on the objective lens, a light transmitting/receiving mirror, and a light receiving fiber.

FIG. 3 shows the positional relationship between the two pupil areas 11A and 11B and the positional relationship between the light transmitting/receiving mirror 21 and the light receiving optical fiber 26 (the fiber holder 27) of the optical distance meter 20. The positions, shapes and elongated directions of the two pupil areas 11A and 11B are determined by the condenser lens 52, the pair of separator lenses 53, the pair of separator masks 55, and the array of photoelectric converting elements of each line sensor 54 so as to provide accurate performance in an autofocus operation. Namely, due to the positions, shapes, and elongated directions of the two pupil areas 11A and 11B, the light transmitting/receiving mirror 21 and the light receiving optical fiber 26 (the fiber holder 27) of the optical distance meter 20 can be positioned so as not to interfere with the two pupil areas 11A and 11B, and accordingly, do not have any adverse effect on the AF sensor unit 50 that uses the light bundles which are passed through the two pupil areas 11A and 11B, thereby ensuring an accurate autofocus operation. In other words, the light transmitting/receiving mirror 21 and the light receiving optical fiber 26 (the fiber holder 27) of the optical distance meter 20 (and also members for supporting these members (not shown)) do not deteriorate the performance of autofocus.

In the present embodiment of the electronic distance meter having the above described structure, in order to make the measuring light reflected by the corner cube reflector 16, especially at a short distance, incident upon the incident end surface 26a of the light receiving optical fiber 26, the light transmitting/receiving mirror 21 is positioned to be eccentric with respect to an optical axis X of the objective lens 11 (i.e., optical axis of the sighting telescope 10), while the measuring light emitted from the light-emitting element 23 is made to project toward the corner cube reflector 16 via the objective lens 11 on an optical path which is eccentric from the optical axis X of the objective lens 11. More specifically, as shown in FIG. 4, the light transmitting/receiving mirror 21 is positioned to be eccentric with respect to the optical axis X downwards by a distance "d", while the measuring light which is emitted by the light-emitting element 23 and has a vertically-elongated oval cross-sectional shape (the hatched area in FIG. 4) is also positioned to be eccentric with respect to the optical axis X downwards by the same distance "d" via a diaphragm 71 (see FIG. 1) positioned in front of the collimating lens 24. In addition, the positions of the two pupil areas 11A and 11B are determined so as not to interfere with the light transmitting/receiving mirror 21 and the light receiving optical fiber 26 (the fiber holder 27) of the optical distance meter 20 (and also members for supporting these members (not shown)). In other words, the light transmitting/receiving mirror 21, the light receiving optical fiber 26, the fiber holder 27, and also members for supporting these members are positioned in an AF shadow area (an AF blind area) 11C between the two pupil areas 11A and 11B. Specifically, the light transmitting/receiving mirror 21 and the light receiving optical fiber 26, the fiber holder 27, and also members for supporting these members are arranged in a direction defined along a line which extends across the diameter of the objective lens 11 and passes through the optical axis X of the objective lens 11, while each of the pupil areas 11A and 11B is determined so as to have a shape extending parallel to the line which extends across the diameter of the objective lens 11. Therefore, the direction of eccentricity of the light transmitting/receiving mirror 21 extends perpendicular to the direction of separation of the two pupil areas 11A and 11B (i.e., the horizontal direction as viewed in FIG. 3).

The electronic distance meter equipped with an autofocus system which has the above described structure performs a distance measuring operation in a manner such as described in the following description.

In the first step, a surveyor (user) aims the sighting telescope 10 at the corner cube reflector 16 so that the optical axis of the sighting telescope 10 is generally in line with the corner cube reflector 16, while viewing the corner cube reflector 16 through a collimator (not shown) which is attached to the sighting telescope 10. In the second step, the surveyor depresses the AF start switch 44 to perform the aforementioned autofocus operation to move the focusing lens 18 to an in-focus position (in-focus state) thereof relative to the corner cube reflector 16. In the third step, in a state where the sighting telescope 10 is in focus relative to the corner cube reflector 16, the surveyor adjusts the direction of the sighting telescope 10 so that the reticle (cross hair) 15 viewed through the eyepiece 14 is precisely centered on the corner cube reflector 16 while looking into the eyepiece 14. In the fourth step, the surveyor depresses the distance-measurement operation start switch 45 to perform the aforementioned distance-calculating operation, wherein the calculated distance is indicated on the indicating device 42.

In the above described distance measuring operation, even if the corner cube reflector 16 is positioned at a short distance, the measuring light emitted from the light-emitting element 23, reflected by the corner cube prism 16 and passed through the objective lens 11 can be incident on the wavelength selection mirror 22 via an optical path which is passes immediately above the light transmitting/receiving mirror 21. Such an optical path can be secured by the eccentric arrangement of the light transmitting/receiving mirror 21 and the optical path of the measuring light projected toward the corner cube reflector 16 with respect to the optical axis X of the objective lens 11. Accordingly, part of the measuring light emitted from the light-emitting element 23, reflected by the corner cube reflector 16 and passed through the objective lens 11 is not interrupted by the light transmitting/receiving mirror 21 to thus travel from the objective lens 11 to the wavelength selection mirror 22 in a space immediately above the light transmitting/receiving mirror 21 to be incident on the incident end surface 26a of the light receiving optical fiber 26. The hatched area shown in FIG. 1 indicates the optical path of the measuring light. Accordingly, even if the corner cube reflector 16 is positioned at a short distance, the distance measuring operation can be performed with no deterioration in precision. The further the corner cube reflector 16 is from the electronic distance meter, the more the measuring light reflected by the corner cube reflector 16 diverges before being incident on the objective lens 11. Therefore, in the case where the corner cube reflector 16 is positioned at a long distance, a sufficient amount of the measuring light emitted from the light-emitting element 23, reflected by the corner cube reflector 16 and passed through the objective lens 11, is not interrupted by the light transmitting/receiving mirror 21 to be therefore incident on the incident end surface 26a of the light receiving optical fiber 26. Accordingly, when the corner cube reflector 16 is positioned at a long distance, the distance measuring operation can be performed with no deterioration in precision.

Figure 6:
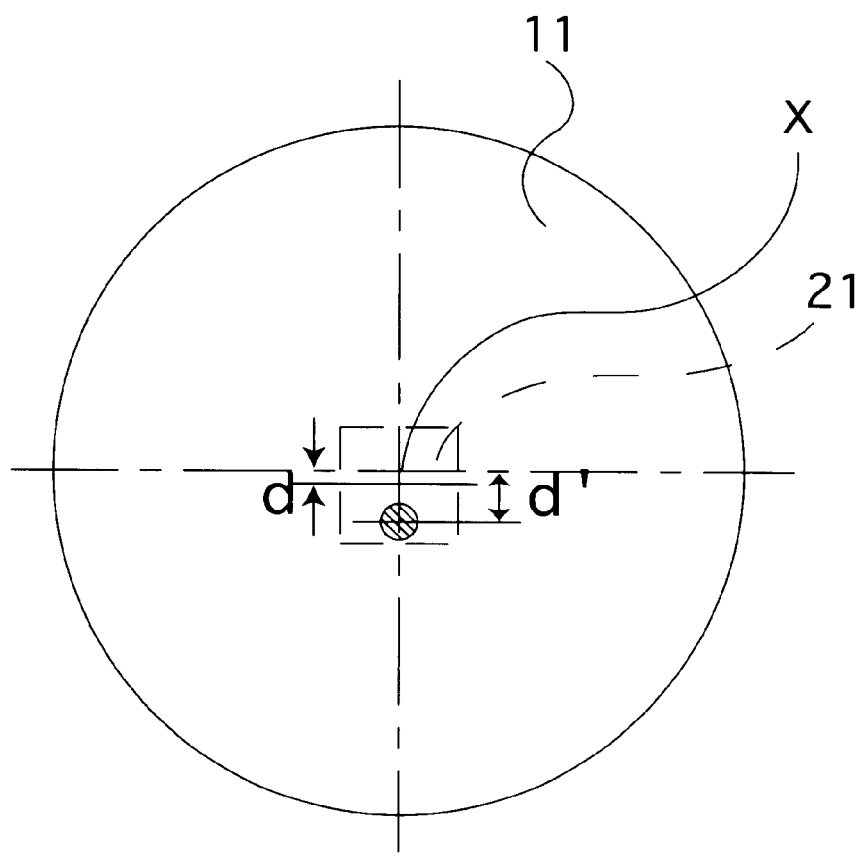
FIG. 6 is a view similar to that of FIG. 4 and illustrates another embodiment of the positional relationship among the objective lens, the light transmitting/receiving mirror and a cross section of the externally-projecting measuring light.
Figure 7:
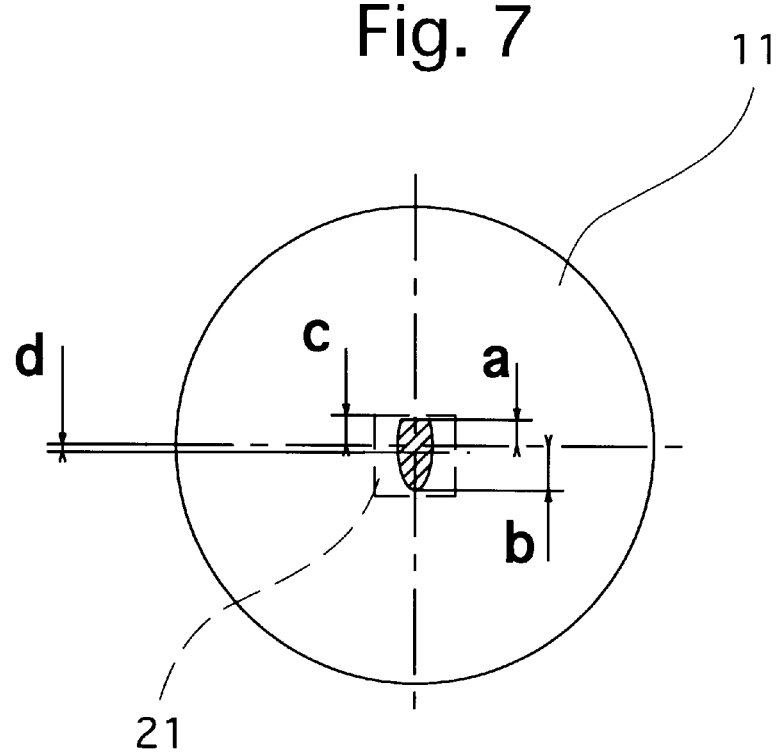
FIG. 7 is a view similar to that of FIG. 4 and illustrates another embodiment of the positional relationship among the objective lens, the light transmitting/receiving mirror and a cross section of the externally-projecting measuring light.

In the above illustrated first embodiment of the electronic distance meter, although the measuring light emitted by the light-emitting element 23 has a vertically-elongated oval cross-sectional shape, the shape and size of the cross-sectional shape of the measuring light can be any other shape and size. For instance, the measuring light can have a horizontally-elongated oval cross-sectional shape as shown in FIG. 5, or a circular cross-sectional shape as shown in FIG. 6. In each of these two cases shown in FIGS. 5 and 6, although the light transmitting/receiving mirror 21 (the light transmitting mirror 21a) is eccentric with respect to the optical axis X downwards by the same distance d as that of the case shown in FIG. 4, the measuring light is eccentric with respect to the optical axis X downwards by a distance d' which is longer than the distance d. Alternatively, the measuring light can have an approximately oval cross sectional shape, the top portion being cut off to have a flat top as shown in FIG. 7. In this case, the following equation is satisfied:

$$d=(b-a)/2$$

wherein "a" represents the distance from the optical axis X of the objective lens 11 to the upper edge of the cross section of the measuring light, "b" represents the distance from the optical axis X of the objective lens 11 to the lower edge of the cross section of the measuring light, and "d" represents the amount of eccentricity of the light transmitting/receiving mirror 21. The axis of the approximately oval cross section of the measuring light is coincident with the optical axis X of the objective lens 11. Although the shape and size of the cross-sectional shape of the measuring light can be any shape and size, the light transmitting/receiving mirror 21 needs to be positioned so as to satisfy the following relationship:

$$b > c$$

wherein "b" represents the aforementioned distance from the optical axis X of the objective lens 11 to the lower edge of the cross section of the measuring light, and "c" represents the distance from the optical axis X of the objective lens 11 to the upper edge of the light transmitting/receiving mirror 21.

The amount of eccentricity of the light transmitting/receiving mirror 21 (the aforementioned distance d) and the amount of eccentricity of the measuring light (the aforementioned distance d') is determined so that at least part of the measuring light reflected by the corner cube reflector 16 passes the light transmitting/receiving mirror 21 through a space immediately above the light transmitting/receiving mirror 21 to be led to the incident end surface 26a of the light receiving optical fiber 26, even if the corner cube reflector 16 is positioned at a short distance. The measuring light reflected by the corner cube reflector 16 can be made to pass the light transmitting/receiving mirror 21 through a space immediately above the light transmitting/receiving mirror 21, to be led to the incident end surface 26a of the light receiving optical fiber 26, by a greater amount as the amount of eccentricity of the measuring light incident on the light transmitting mirror 21a from the optical axis X of the objective lens 11 is greater.

FIGS. 8 through 14 show the second embodiment of the electronic distance meter (EDM) equipped with an autofocus system, according to the present invention. The second embodiment of the electronic distance meter is substantially the same as the first embodiment of the electronic distance meter except that a tilting plane-parallel plate 70, which serves as a measuring-light incident position changing device, is disposed between the light-emitting element 23 and the switching mirror 28, that the electronic distance meter is provided with a control circuit 80 which controls the tilt of the tilting plane-parallel plate 70, and that a relay lens 72 is disposed between the fixed mirror 25 and the ND filter 29. Parts or elements of the second embodiment which are identical to those of the first embodiment are designated by the same reference numerals, and accordingly will not be hereinafter described in detail.

Figure 10:
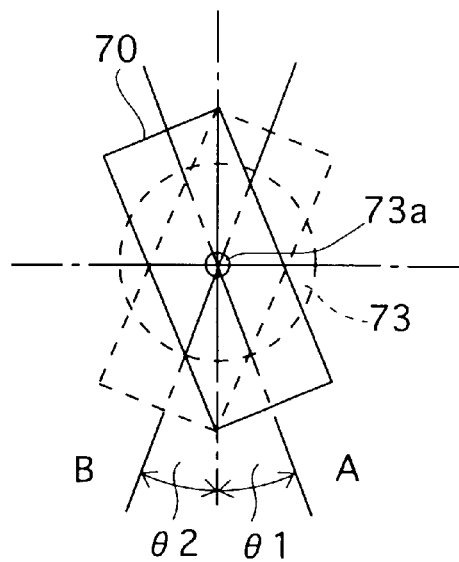
FIG. 10 is a side view of a tilting plane-parallel plate and a drive mechanism for rotating the tilting plane-parallel plate which are provided in the second embodiment of the electronic distance meter shown in FIG. 8.

The tilting plane-parallel plate 70 is positioned so as to tilt (incline) with respect to a plane perpendicular to the optical axis of the collimating lens 24. As shown in FIG. 10, the second embodiment of the electronic distance meter is provided with a switching motor (shown by a broken line) 73 which is disposed adjacent to the tilting plane-parallel plate 70. The switching motor 73 has a rotary drive shaft 73a driven to rotate forwardly and reversely which extends perpendicular to the optical axis of the light-emitting element 23. The rotary drive shaft 73a is fixedly coupled to the center of the tilting plane-parallel plate 70. Forward or reverse rotation of the rotary drive shaft 73a by a certain angle of rotation causes the tilting plane-parallel plate 70 to be positioned at a short-distance position "A", at which the tilting plane-parallel plate 70 tilts in a forward direction (counterclockwise as viewed in FIG. 8) with respect to a plane perpendicular to the optical axis of the light-emitting element 23 by an angle θ1, or a long-distance position "B" at which the tilting plane-parallel plate 70 tilts in a reverse direction (clockwise as viewed in FIG. 8) with respect to the same plane by an angle θ2, respectively. The absolute values of the angle θ1 and the angle θ2 are the same though the signs are opposite. The switching motor 73 is connected to the control circuit 80. The switching motor 73 is provided therein with a sensor (not shown) for determining whether the tilting plane-parallel plate 70 is positioned at the short-distance position A or the long-distance position B.

Figure 11:
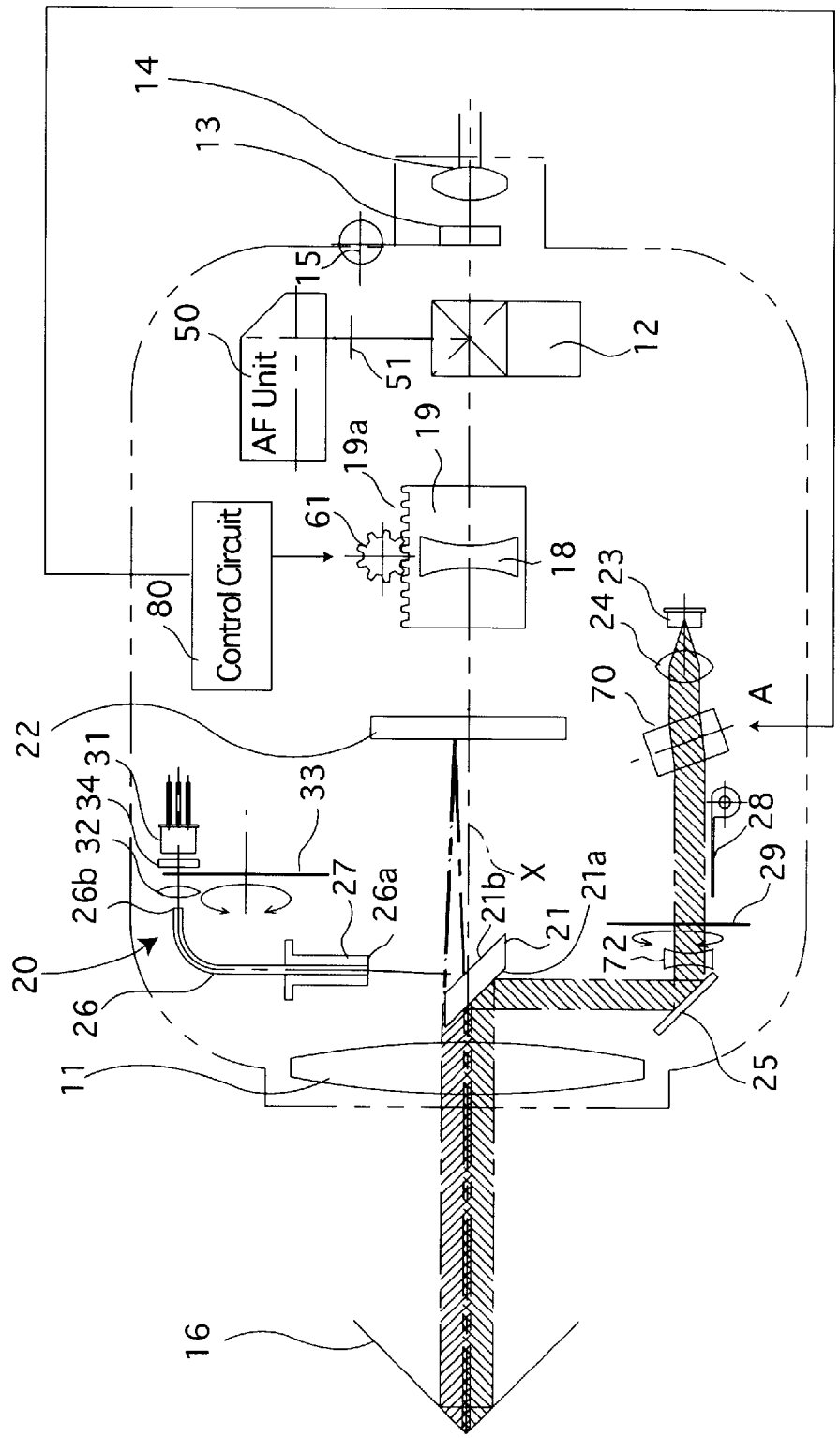
FIG. 11 is a view similar to that of FIG. 8 and illustrates an optical path of the measuring light when a sighting object is close to the electronic distance meter.
Figure 12:
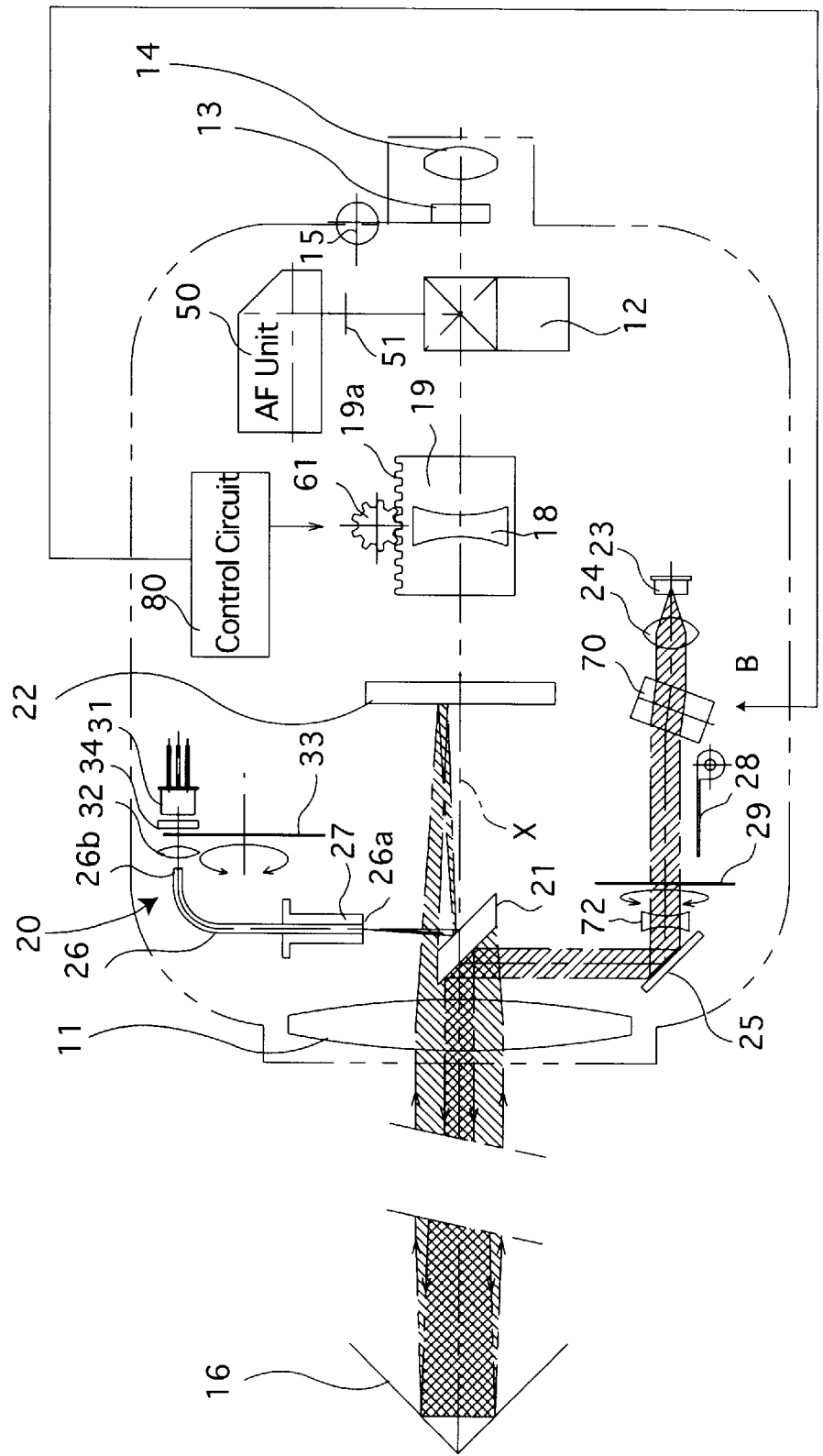
FIG. 12 is a view similar to that of FIG. 8 and illustrates an optical path of the measuring light when a sighting object is at a distant location from the electronic distance meter.

The tilting plane-parallel plate 70 is positioned to be at the short-distance position A or the long-distance position B when the corner cube reflector 16 is positioned at a short distance or a long distance, respectively. For instance, the tilting plane-parallel plate 70 is positioned at the short-distance position A as shown in FIG. 11 when the corner cube reflector 16 is positioned at a distance equal to or smaller than five meters, or at the long-distance position B as shown in FIG. 12 when the corner cube reflector 16 is positioned at a distance greater than five meters. When the tilting plane-parallel plate 70 is positioned at the short-distance position A as shown in FIG. 11, the measuring light emitted from the light-emitting element 23 (indicated by a hatched area in FIG. 11) is shifted downwards to a position parallel to itself as viewed in FIG. 11 via the tilting plane-parallel plate 70 so that the central axis of the measuring light is incident on the light transmitting mirror 21a at a point (first incident point) thereon away from the optical axis X of the objective lens 11. More specifically, when the tilting plane-parallel plate 70 is positioned at the short-distance position A as shown in FIG. 11, the measuring light emitted from the light-emitting element 23 is shifted to a position parallel to itself downwards as viewed in FIG. 11 via the tilting plane-parallel plate 70 so that the central axis of the measuring light emitted from the light-emitting element 23 and reflected by the fixed mirror 25 is incident on the light transmitting mirror 21a at a point (first incident point) thereon away from a point of intersection of the light transmitting mirror 21a and the optical axis X of the objective lens 11. Subsequently, the measuring light reflected by the light transmitting mirror 21a proceeds toward the corner cube reflector 16 to be reflected thereby. Subsequently, part of the measuring light reflected by the corner cube reflector 16 and passed through the objective lens 11 is not interrupted by the light transmitting/receiving mirror 21 to thus travel from the objective lens 11 to the wavelength selection mirror 22 in a space immediately above the light transmitting/receiving mirror 21 to be reflected back by the wavelength selection filter 22. Subsequently, the measuring light reflected back by the wavelength selection filter 22 is reflected by the light-receiving mirror 21b to be incident on the incident end surface 26a of the light receiving optical fiber 26. Accordingly, the light-receiving element 31 receives a sufficient light amount of the measuring light, which does not deteriorate the precision in measuring the object distance.

On the other hand, when the tilting plane-parallel plate 70 is positioned at the long-distance position B as shown in FIG. 12, the measuring light emitted from the light-emitting element 23 (indicated by a hatched area in FIG. 12) is shifted to a position parallel to itself upwards, as viewed in FIG. 12, via the tilting plane-parallel plate 70 so that the central axis of the measuring light emitted from the light-emitting element 23 and reflected by the fixed mirror 25 is incident on the light transmitting mirror 21a either at a point (second incident point) substantially equivalent to a point of intersection of the light transmitting mirror 21a and the optical axis X of the objective lens 11, or at the exact point of intersection thereof. Subsequently, the measuring light reflected by the light transmitting mirror 21*a* proceeds toward the corner cube reflector 16 to be reflected thereby. Since the measuring light reflected by the corner cube reflector 16 diverges sufficiently before being incident on the objective lens 11 when the corner cube reflector 16 is positioned at a long distance, a sufficient amount of the measuring light emitted from the light-emitting element 23, reflected by the corner cube reflector 16 and passed through the objective lens 11 is not interrupted by the light transmitting/receiving mirror 21 to be therefore incident on the incident end surface 26*a* of the light receiving optical fiber 26. Since the absolute values of the angle θ1 and the angle θ2 are the same as mentioned above, the optical path length of the tilting plane-parallel plate 70 positioned at the short-distance position A is identical to that positioned at the long-distance position B, and the tilting plane-parallel plate 70 does not have any adverse effect on the precision in measuring the object distance. The light rays traveling between the collimating lens 24 and the relay lens 72 are parallel rays.

Figure 9:
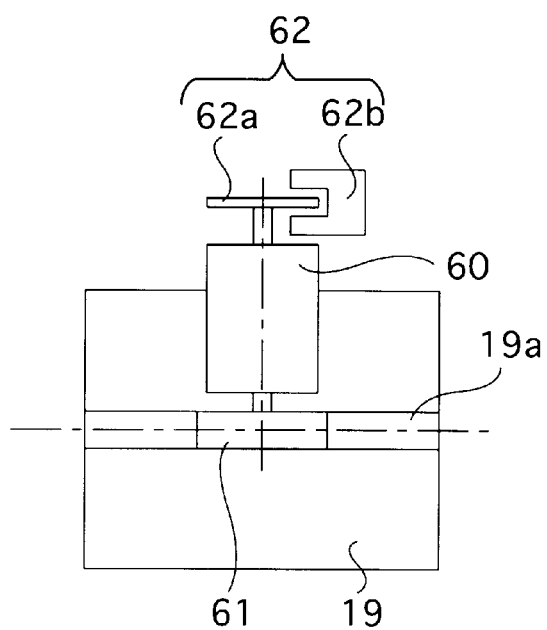
FIG. 9 is a schematic plan view of a focusing-lens drive mechanism provided in the electronic distance meter shown in FIG. 8, viewed in the direction of an arrow IX shown in FIG. 2.
Figure 8:
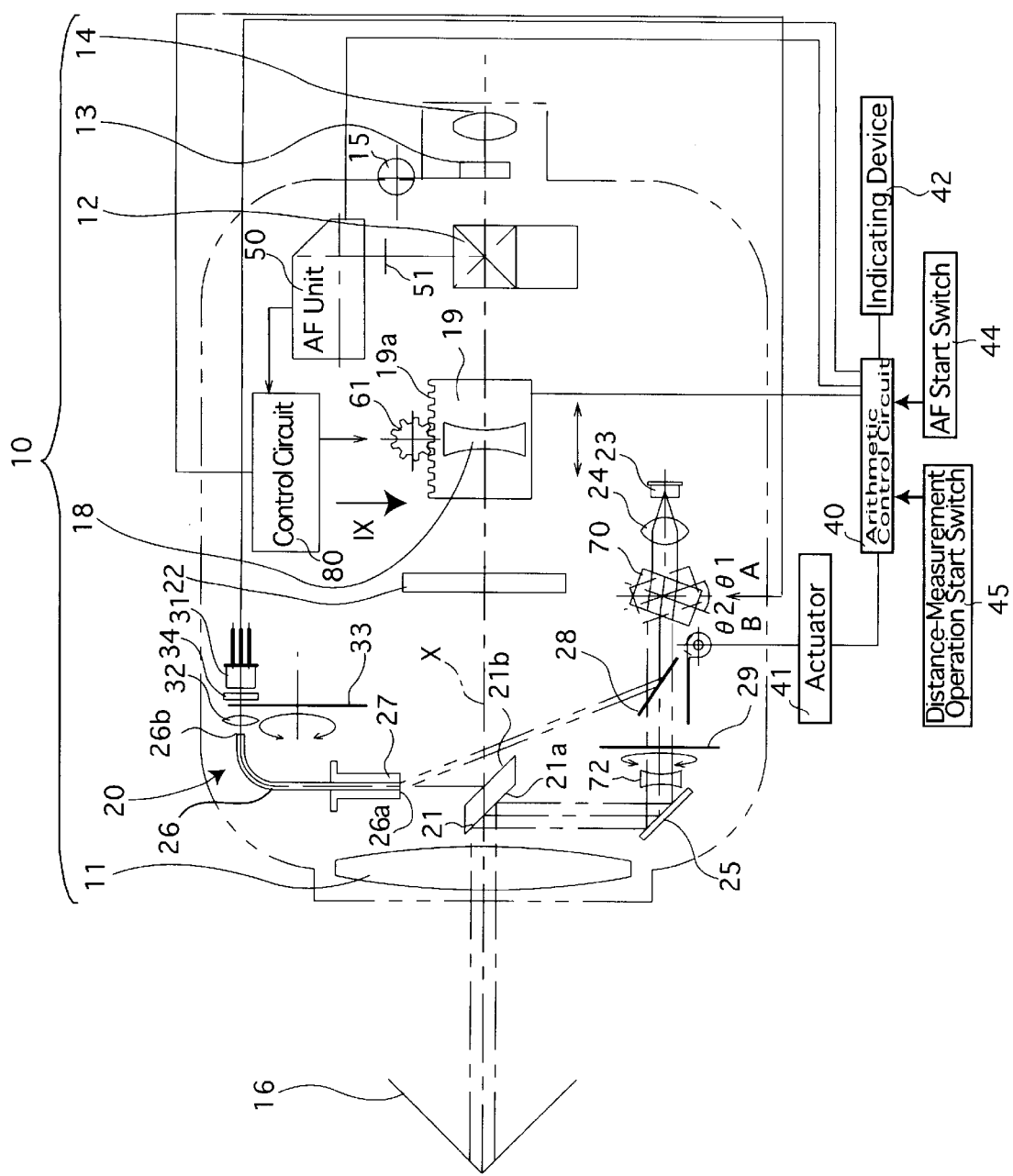
FIG. 8 is a schematic diagram of the second embodiment of the electronic distance meter equipped with an autofocus system, according to the present invention.

The focusing lens 18 is supported by a lens frame 19. The lens frame 19 is guided in a direction of an optical axis of the sighting telescope optical system (i.e., the optical axis X of the objective lens 11), and is provided with a rack 19*a* which extends in the optical axis direction. The electronic distance meter is provided therein with a motor 60 (see FIG. 9). A pinion 61 which is in mesh with the rack 19*a* is fixed to a rotary drive shaft of the motor 60. With this structure, driving the motor 60 causes the focusing lens 18 to move, which is supported by the lens frame 19, in the optical axis direction. As shown in FIG. 9, the electronic distance meter has an encoder (angle sensor/lens position detection device) 62 provided in association with the motor 60. In the illustrated embodiment, the encoder 62 is an optical encoder which includes a rotary disc 62*a* having a plurality of radial slits (not shown) and a photo-sensor 62*b* having a light emitter and a light receiver which are positioned on the opposite sides of the rotary disc 62*a*. The amount of rotation (angle of rotation) of the motor 60 is detected with the encoder 62.

Figure 13:
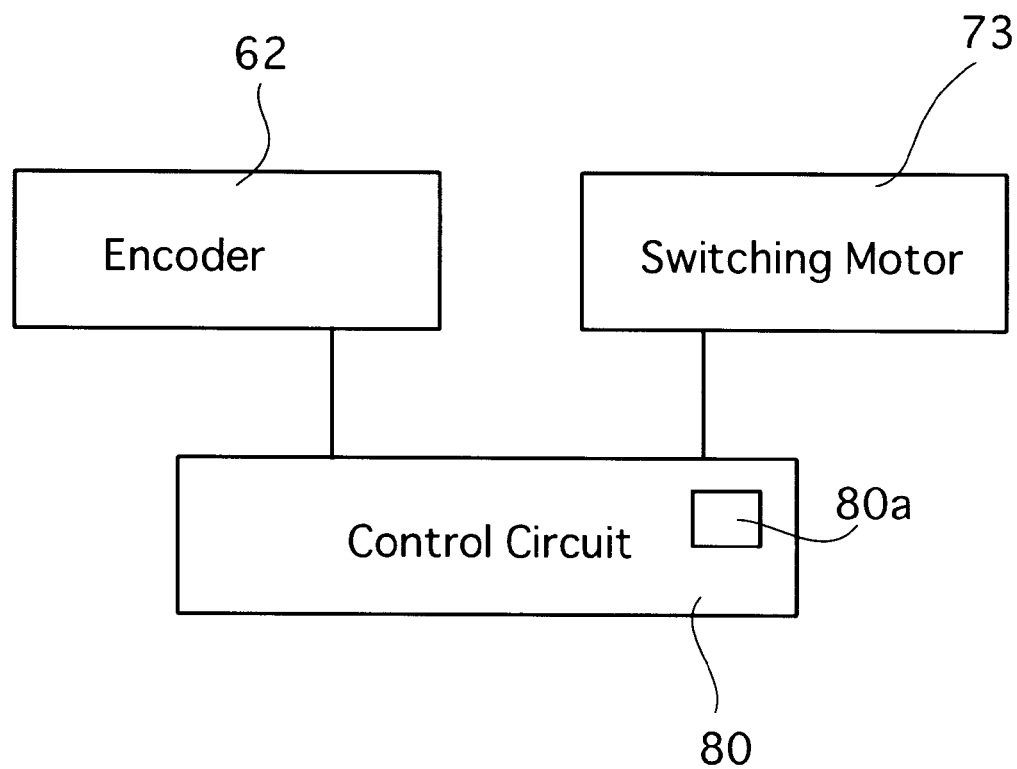
FIG. 13 is a block diagram of a control system for controlling the second embodiment of the electronic distance meter shown in FIG. 8.

FIG. 13 is a block diagram of a control system including the encoder 62, the switching motor 73 and the control circuit 80. The control circuit 80 is provided therein with a memory (storing device) 80*a* in which information for determining whether the axial position of the focusing lens 18 which corresponds to the detected amount of rotation (angle of rotation) of the motor 60, which is detected with the encoder 62, is in a short-distance in-focus range which corresponds to a short distance range of the object or a long-distance in-focus range which corresponds to a long distance range of the object is stored. The short distance range is determined as a distance range in which a majority of the measuring light which is reflected by the corner cube reflector 16 and passed through the objective lens 11 is interrupted by the light transmitting/receiving mirror 21 to the extend where the amount of light of the measuring light incident upon the incident end surface 26*a* of the light receiving optical fiber 26 becomes insufficient to perform the distance measuring operation when the tilting plane-parallel plate 70 is positioned at the long-distance position B. The border between the short distance range and the long distance range can be determined by changing, e.g., the size of the light transmitting/receiving mirror 21 and the diameter of the light receiving optical fiber 26.

Figure 14:
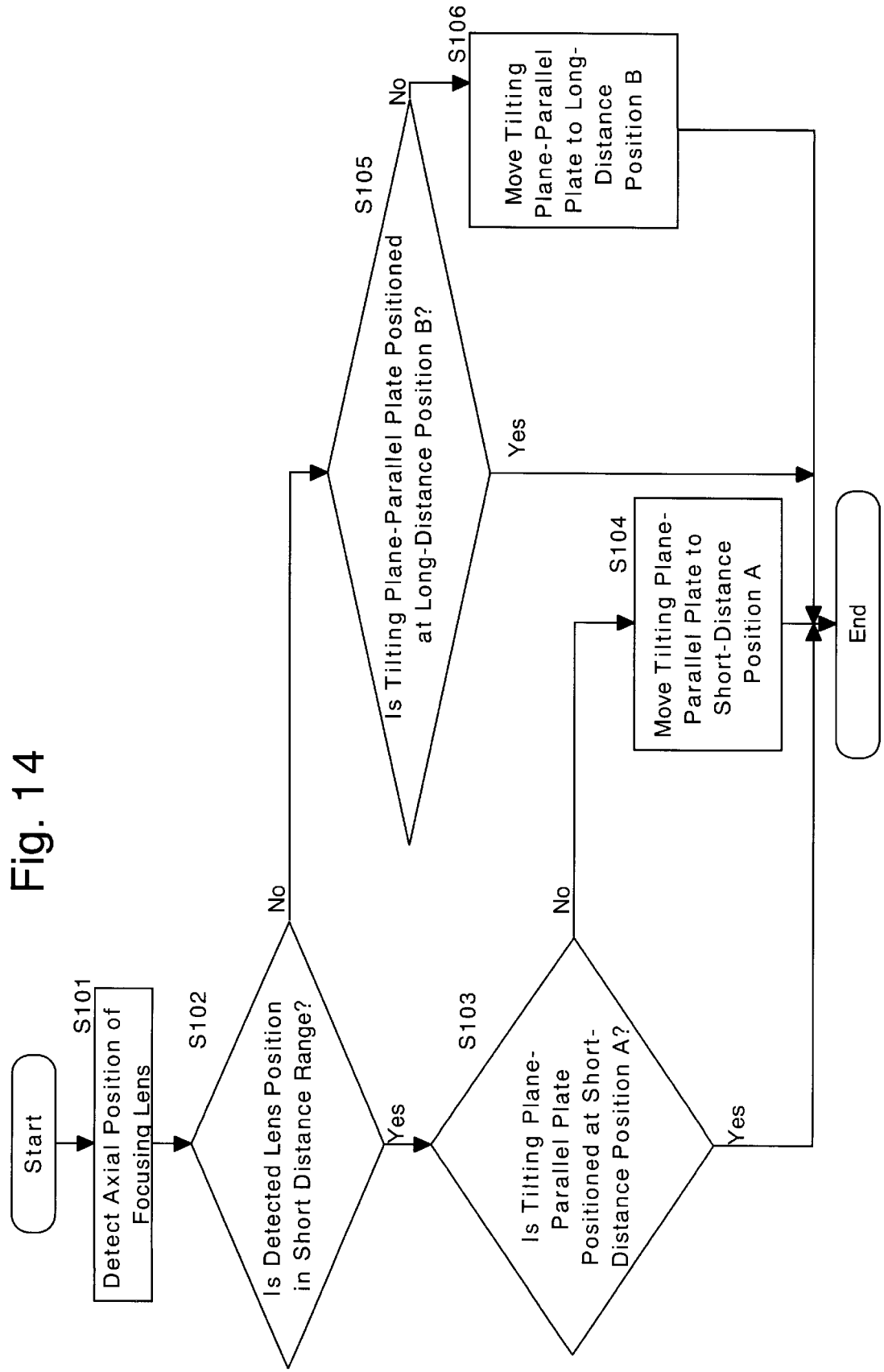
FIG. 14 is a flow chart showing a process of driving of the tilting plane-parallel plate which is performed by the control circuit shown in FIG. 13.

FIG. 14 shows a tilting-plane-parallel-plate driving process which is performed immediately after the distance-measurement operation start switch 45 is turned ON. The process shown in FIG. 14 is performed by the control circuit 80. Firstly, the axial position of the focusing lens 18 is detected via the encoder 62 (step S101). Subsequently, it is determined whether the detected position of the focusing lens 18 is in the aforementioned short-distance in-focus range with reference to the information stored in the memory 80*a* (step S102). If it is determined that the detected position of the focusing lens 18 is in the short-distance in-focus range (if "Yes" at step S102), it is determined whether the tilting plane-parallel plate 70 is positioned at the short-distance position A via the angle sensor provided in the switching motor 73 (step S103). If the tilting plane-parallel plate 70 is positioned at the long-distance position B (if "No" at step S103), the switching motor 73 is driven to rotate the tilting plane-parallel plate 70 to the short-distance position A (step S104), and control ends. If the tilting plane-parallel plate 70 is positioned at the short-distance position A (if "Yes" at step S103), control ends. If it is determined at step S102 that the detected position of the focusing lens 18 is out of the short-distance in-focus range (if "No" at step S102), it is determined whether the tilting plane-parallel plate 70 is positioned at the long-distance position B via the angle sensor provided in the switching motor 73 (step S105). If the tilting plane-parallel plate 70 is not positioned at the long-distance position B (if "No" at step S105), the switching motor 73 is driven to move the tilting plane-parallel plate 70 to the long-distance position B (step S106), and control ends. If the tilting plane-parallel plate 70 is positioned at the long-distance position B (if "Yes" at step S105), control ends.

According to the above-described tilting-plane-parallel-plate driving process, the tilting plane-parallel plate 70 is positioned at the short-distance position A and the long-distance position B when the focusing lens 18 is positioned in the short-distance in-focus range and the long-distance in-focus range, respectively. Therefore, the position of the tilting plane-parallel plate 70 changes depending the axial position of the focusing lens 18 positioned at an in-focus position thereof, i.e., the position of the tilting plane-parallel plate 70 changes in accordance with the calculated distance. Namely, the incident point of the central axis of the measuring light emitted from the light-emitting element 23 upon the light transmitting mirror 21*a* of the light transmitting/receiving mirror 21 can be varied in accordance with the distance from the electronic distance meter to the corner cube reflector 16.

In the above described second embodiment of the electronic distance meter, the tilting plane-parallel plate 70 is positioned at the short-distance position A or the long-distance position B by determining whether the distance from the electronic distance meter to the corner cube reflector 16 is in the short distance range or the long distance range in accordance with the axial position of the focusing lens 18 as described above. However, if the AF sensor unit 50 can detect the amount of defocus and direction of focal shift on the reference focal plane 51 for any given location in the whole range of distance measurement, the tilting plane-parallel plate 70 can be positioned at the short-distance position A or the long-distance position B by determining whether the distance from the electronic distance meter to the corner cube reflector 16 is in the short distance range or the long distance range in accordance with the detected amount of defocus and direction of focal shift.

In each of the above described first and second embodiments of the electronic distance meters, the light transmitting/receiving mirror 21 is eccentric with respect to the optical axis X downwards, however, the light transmitting/receiving mirror 21 can be eccentric with respect to the optical axis X not only downwards but in any other direction as long as the light transmitting/receiving mirror 21 does not interfere with the two pupil areas 11A and 11B.

Although each of the above described first and second embodiments of the electronic distance meters is of a type which is equipped with an autofocus system, the present invention can also be applied to an electronic distance meter equipped with a manual focus system. Furthermore, the tilting plane-parallel plate 70 can be manually tilted to be positioned at the short-distance position A or the long-distance position B. In this case it can be determined whether the tilting plane-parallel plate 70 needs to be positioned at the short-distance position A or the long-distance position B by firstly detecting the axial position of the focusing lens 18 after it is manually adjusted, and subsequently determining whether the distance which corresponds to the detected axial position of the focusing lens 18 is in the short-distance in-focus range or the long-distance in-focus range.

Figure 15:
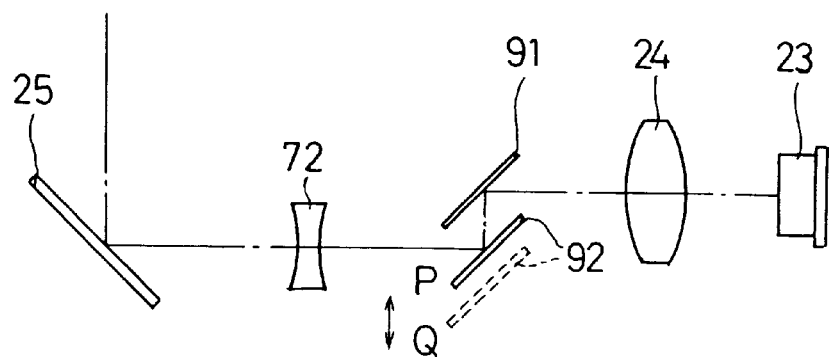
FIG. 15 is a side view of another embodiment of an measuring-light incident position changing device for each of the first and second embodiments of the electronic distance meters shown in FIGS. 1 and 8.
Figure 16:
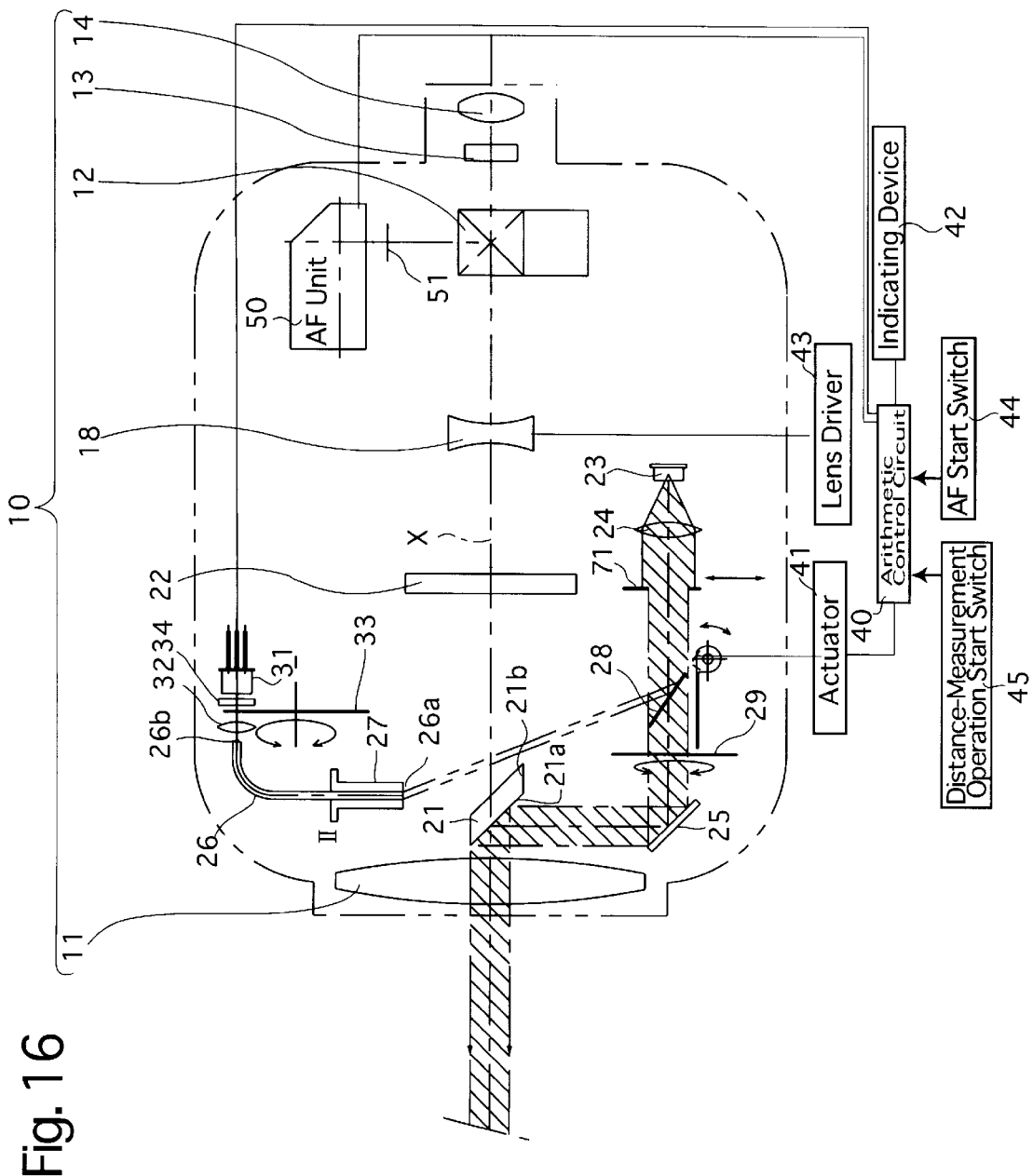
FIG. 16 is a view similar to that of FIG. 1 and illustrates still another embodiment of the measuring-light incident position changing device for each of the first and second embodiments of the electronic distance meters shown in FIGS. 1 and 8.

In the above described second embodiment of the electronic distance meter, although the tilting plane-parallel plate 70 is used as a measuring-light incident position changing device for changing the incident point of the central axis of the measuring light, emitted from the light-emitting element 23, upon the light transmitting mirror 21a of the light transmitting/receiving mirror 21, two mirrors which are arranged parallel to each other can be used as the measuring-light incident position changing device. In this case, the incident point of the central axis of the measuring light, emitted from the light-emitting element 23, upon the light transmitting mirror 21a can be varied by moving one of the two mirrors to a position parallel to the other mirror. For instance, as shown in FIG. 15, two mirrors 91 and 92 which are arranged parallel to each other are disposed between the light-emitting element 23 and the switching mirror 28 (omitted from FIG. 15 for clarity), while the mirror 92 is driven to move between a first position P (shown by solid line in FIG. 15) and a second position Q (shown by broken line in FIG. 15) parallel to the first position P by a drive mechanism (not shown) provided in the electronic distance meter. In this case, when the mirror 92 is positioned at the first position P, the central axis of the measuring light emitted from the light-emitting element 23 is incident on the light transmitting mirror 21a at a point thereon substantially on (or exactly on) the optical axis X of the objective lens 11. On the other hand, when the mirror 92 is positioned at the second position Q, the central axis of the measuring light emitted from the light-emitting element 23 is incident on the light transmitting mirror 21a at a point thereon away from the optical axis X of the objective lens 11. Accordingly, the mirror 92 is controlled to be positioned at either the first position P or the second position Q in accordance with the distance from the electronic distance meter to the corner cube reflector 16. However, the variation of the optical path length which is caused by a parallel-movement of the mirror 92 needs to be compensated (i.e., corrected). With this structure, similar to the second embodiment of the electronic distance meter, the incident point of the central axis of the measuring light emitted from the light-emitting element 23 upon the light transmitting mirror 21a of the light transmitting/receiving mirror 21 can be varied in accordance with the distance from the electronic distance meter to the corner cube reflector 16. Alternatively, the incident point of the central axis of the measuring light upon the light transmitting mirror 21a of the light transmitting/receiving mirror 21 can be varied by moving the diaphragm 71 in a direction perpendicular to the optical axis of the light-emitting element 23 as shown in FIG. 16.

In the above illustrated embodiments, although the corner cube reflector 16 serving as a sighting object is placed at a point of measurement, the above described problem of the returned measuring light being interrupted by the light transmitting/receiving mirror 21 by a greater amount as the target is closer to the electronic distance meter can be overcome even in the case where no corner cube reflector is placed at a point of measurement.

Although the Porro-prism erecting system 12 is used as an erecting optical system and also as a beam splitting optical system for splitting the incident light bundle into two light bundles so that one of the two light bundles proceeds toward the AF sensor unit 50 while the other light bundle proceeds toward the eyepiece 14, any other optical elements can be used instead of the Porro-prism erecting system 12.

In the above illustrated second embodiment, the arithmetic control circuit 40 and the control circuit 80 can be integrated into a single control circuit.

As can be understood from the foregoing, according to the present invention, an electronic distance meter which is free from the aforementioned problem of a decrease in the amount of light incident upon the light receiving mirror 21b when the sighting object is close to the electronic distance meter, and free from the aforementioned problem of deterioration of the precision in measuring the object distance that is caused by a decrease in the amount of light incident upon the light receiving mirror 21b can be achieved. Furthermore, according to the present invention, an electronic distance meter equipped with an autofocus system which is free from the same problems can be achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An electronic distance meter comprising:

a sighting telescope having an objective lens for sighting an object;

a reflection member provided behind said objective lens, wherein said reflection member is positioned so as to be eccentric with respect to an optical axis of said objective lens, said reflection member including a reflection surface which intersects with said optical axis of said objective lens;

an optical distance meter for determining the distance to said object, said optical distance meter including a light-transmitting optical system for transmitting a measuring light via said reflection member and said objective lens, and a light-receiving optical system for receiving a portion of said measuring light which is reflected by said object, subsequently passed through said objective lens, and not obstructed by said reflection member, wherein said measuring light projected toward said object via said light-transmitting optical system travels toward said object along an optical path which is eccentric with respect to said optical axis of said objective lens; and a measuring-light incident position changing device for changing an incident point of a central axis of said measuring light on said reflection surface of said reflection member between a first incident point on said reflection surface away from a point of intersection of said reflection surface and said optical axis of said objective lens, and a second incident point on said reflection surface substantially on said point of intersection.

2. The electronic distance meter according to claim 1, wherein said reflection member is positioned so as to satisfy the following relationship:

b>c wherein "b" designates the distance from said optical axis of said objective lens to an edge of a cross section of said measuring light in a first direction of eccentricity of said reflection member; and "c" designates the distance from said optical axis of said objective lens to an edge of said light reflection member in a second direction opposite to said first direction of eccentricity of said reflection member.

3. The electronic distance meter according to claim 1, wherein said measuring-light incident position changing device comprises a diaphragm positioned on an optical path of said measuring light; and wherein said incident point of a central axis of said measuring light on said reflection surface is changed by moving said diaphragm in a direction perpendicular to said optical path of said measuring light.

4. The electronic distance meter according to claim 1, further comprising:

a controller which controls said measuring-light incident position changing device so that said measuring-light incident position changing device changes the incident point of said central axis of said measuring light to said first incident point and said second incident point when said object is positioned at a short distance and a long distance, respectively.

5. The electronic distance meter according to claim 4, wherein said sighting telescope comprises a focus adjustment lens guided along an optical axis of said sighting telescope;

wherein said electronic distance meter further comprises a lens position detection device which detects an axial position of said focus adjustment lens; and wherein said controller controls said measuring-light incident position changing device so that said measuring-light incident position changing device changes the incident point of said central axis of said measuring light between said first incident point and said second incident point in accordance with a result of detection of said lens position detection device.

6. The electronic distance meter according to claim 4, wherein said measuring-light incident position changing device comprises a plane-parallel plate disposed between a light-emitting element which emits said measuring light and said reflection member, wherein said plane-parallel plate is inclined with respect to a plane perpendicular to an optical axis of said light-transmitting optical system.

7. The electronic distance meter according to claim 6, wherein said controller controls said plane-parallel plate so as to rotate in first and second rotational directions by a same angle of rotation when said object is positioned at said short distance and said long distance, respectively.

8. The electronic distance meter according to claim 4, wherein said reflection member is made of a parallel-plate mirror having front and rear surfaces parallel to each other;

wherein said reflection member is inclined to said optical axis of said objective lens; and wherein said surface of said reflection member on which said point of intersection is positioned comprises said front surface of said reflection member which faces said objective lens.

9. The electronic distance meter according to claim 6, wherein said light-transmitting optical system comprises a collimating lens positioned between said light-emitting element and said plane-parallel plate.

10. The electronic distance meter according to claim 1, wherein said light-receiving optical system comprises a wavelength selection filter positioned behind said reflection member.

11. The electronic distance meter according to claim 6, wherein said measuring-light incident position changing device comprises a motor for rotating said plane-parallel plate.

12. The electronic distance meter according to claim 4, wherein said measuring-light incident position changing device comprises two mirrors which are arranged parallel to each other and are provided between a light-emitting element which emits said measuring light and said reflection member, wherein one of said two mirrors is driven to move relative to the other of said two mirrors in order to change the incident position of the central axis of said measuring light.

13. The electronic distance meter according to claim 1, further comprising:

a focusing lens provided in said sighting telescope;

a focus detecting device for detecting a focus state of said sighting telescope; and an autofocus drive system which drives said focusing lens to move along the optical axis relative to the objective lens in order to bring said object into focus in accordance with said focus state detected by said focus detecting device.

14. The electronic distance meter according to claim 13, further comprising:

a controller which controls said measuring-light incident position changing device so that said measuring-light incident position changing device changes the incident point of said central axis of said measuring light to said first incident point and said second incident point when said controller determines that said object is positioned at a short distance and a long distance, respectively, in accordance with said focus state of said sighting telescope which is detected by said focus detecting device.

15. The electronic distance meter according to claim 13, further comprising:

a controller which controls said measuring-light incident position changing device so that said measuring-light incident position changing device changes the incident point of said central axis of said measuring light to said first incident point and said second incident point when said controller determines that said object is positioned at a short distance and a long distance, respectively, in accordance with an axial position of said focusing lens driven by said autofocus drive system.

16. The electronic distance meter according to claim 13, wherein said focus detecting device comprises a phase-difference detection focus detecting device which detects an in-focus state from a correlation between a pair of images respectively formed by two light bundles which are respectively passed through two different pupil areas on said objective lens of said sighting telescope.

17. The electronic distance meter according to claim 16, wherein a direction of eccentricity of said reflection member extends perpendicular to a direction of separation of said two pupil areas.

* * * * *